Figure 1:
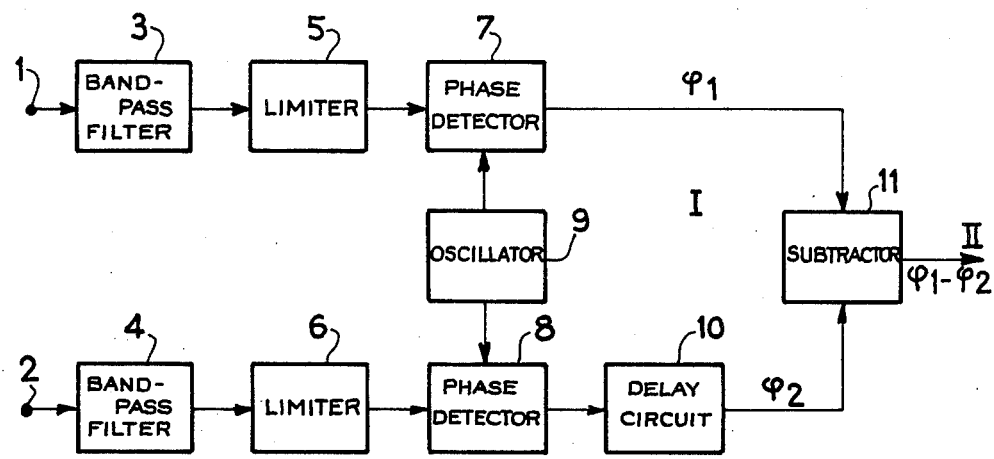

United States Patent [19]

Beauvais et al.

[11] 4,025,775
[45] May 24, 1977

[54] CORRELATOR DEVICE

[75] Inventors: Thierry Beauvais; Roland Carré, both of Paris, France

[73] Assignee: Thomson-CSF, Paris, France

[22] Filed: June 4, 1976

[21] Appl. No.: 692,872

[30] Foreign Application Priority Data

June 10, 1975 France .............................. 75.18058

[52] U.S. Cl. .......................... 235/181; 235/150.53; 307/232; 328/134
[51] Int. Cl.² ........................................ G06F 15/34
[58] Field of Search .................... 235/181, 150.53; 328/133, 134; 307/232; 343/17.2 R, 17.5, 7.7; 329/50, 112, 122; 325/60

[56] References Cited
UNITED STATES PATENTS

| | | | |
|---|---|---|---|
| 3,605,017 | 9/1971 | Chertok et al. ..................... | 325/60 |
| 3,657,659 | 4/1972 | Johnson .............................. | 307/232 |
| 3,719,946 | 3/1973 | Sletten et al. ................. | 343/17.2 R |
| 3,821,736 | 6/1974 | Kuck et al. ....................... | 343/17.5 |
| 3,875,394 | 4/1975 | Shapely .............................. | 235/181 |
| 3,944,938 | 3/1976 | Brouant ............................. | 328/134 |

*Primary Examiner*—Felix D. Gruber
*Attorney, Agent, or Firm*—Cushman, Darby & Cushman

[57] ABSTRACT

The present invention relates to devices for correlating two phase-modulated signals, in order to determine the delay between said two signals. The signals are applied to phase detectors which receive one and the same local wave. One of the signals is delayed by a variable delay time. The phase values obtained are subtracted from one another. The result is then integrated in the complex plane for a given period of time. The variation of the variable delay permits to determine the correlation function and in particular, the position and the amplitude of the correlation peak.

12 Claims, 8 Drawing Figures

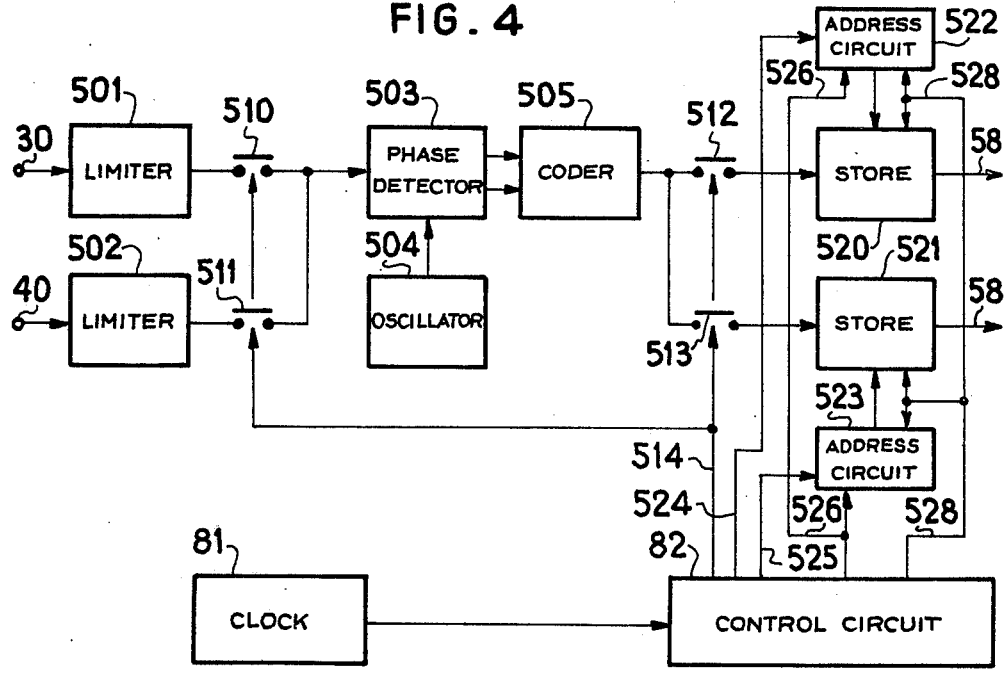
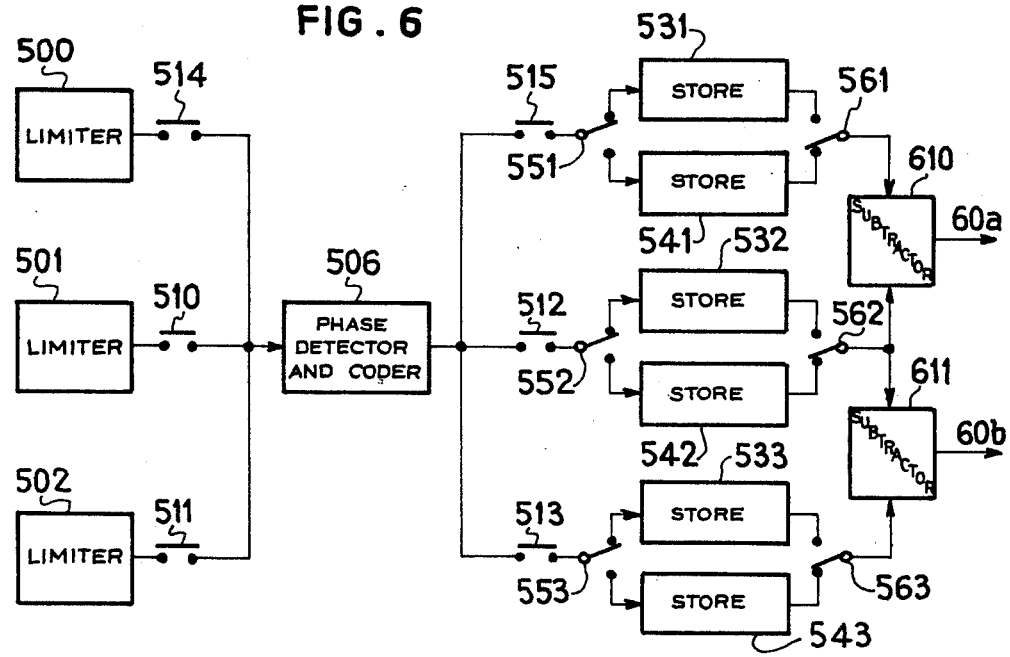

CORRELATOR DEVICE

The present invention relates to devices for computing the correlation function of two complex signals. It relates equally to systems for the measurement, by correlation, of the delay separating two complex electrical signals emitted by one and the same source, a knowledge of the delay making it possible to pinpoint the source afterwards.

Measurement of the delay is performed by plotting the square of the modulus of the correlation function of the received signals and by evaluating the maximum in this plot, this being known as the correlation peak. To plot this function, one of the received signals is delayed by a variable time in relation to the other. With each delay value there corresponds a point in the correlation function. The peak is reached when the delay introduced in the correlator is equal to the differential delay between the two signals at the input to the device.

To achieve high accuracy of measurement of the delay a large number of integrating elements is required to compute the function which latter must itself be represented by an adequate number of points. In addition, it is necessary to provide stationary signals at the input of the device, throughout the time of measurement.

The signals emitted by an unknown source which it is desired to pinpoint, are often very short. Even current known correlators operating on a real-time basis at very high speed, may not have sufficient time for measurement.

Moreover, the correlation function obtained from known correlators is modulated by the carrier of the signals. The determination of the correlation peak therefore requires detection of the envelope of the function.

Finally, in known digital correlators, the limitation of the signal quantizing levels, in view of the limited capacities of the computing circuits, gives rise to a loss in sensitivity.

The object of the present invention is a correlator device capable of performing a correlation with an improved degree of sensitivity, by the use of novel processing and computing techniques. It relates to a device which performs correlation not upon the amplitude of the signals but upon their phase modulation, this in order to exclude the effect of the dynamic range of these signals. It also relates to a correlator device utilizing digital techniques in order to effect point-by-point plotting of the cross-correlation function of the two signals, working from a limited number of samples taken at high frequency, which are used to determine each point in the function.

In accordance with the invention, there is provided a correlator device for determining the correlation function of two phase-modulated signals having a given carrier frequency comprising, phase detecting means to which the said modulated signals are applied separately for delivering the phase difference $\phi 1$ and $\phi 2$ between said modulated signals and a reference signal; delay means for delaying one of the signals in relation to the other by a variable delay time, subtractor means for forming the difference $\phi 1 - \phi 2$, computing means for forming the sine and the cosine of the difference $\phi 1 - \phi 2$, for integrating separately said sine and cosine during a given period of time and, for delivering the sum of the square of the result of said integrations, and means for varying said variable delay time.

In accordance with one embodiment of the invention, the aforesaid computing means supplied with the phase values obtained at the output of the substractor means, comprise means for converting these values into their sine and cosine counterparts, means for integrating these components and means for squaring and summing the integrated components.

The plot of the correlation of the function is obtained in a point-by-point fashion at an interval which depends upon the delay differentials between the computing of successive points. In the case where the interval between the points in the correlation function is large, it is advantageous to interpolate the function between two successive points in order to improve the accuracy of its reconstitution.

Figure 2:
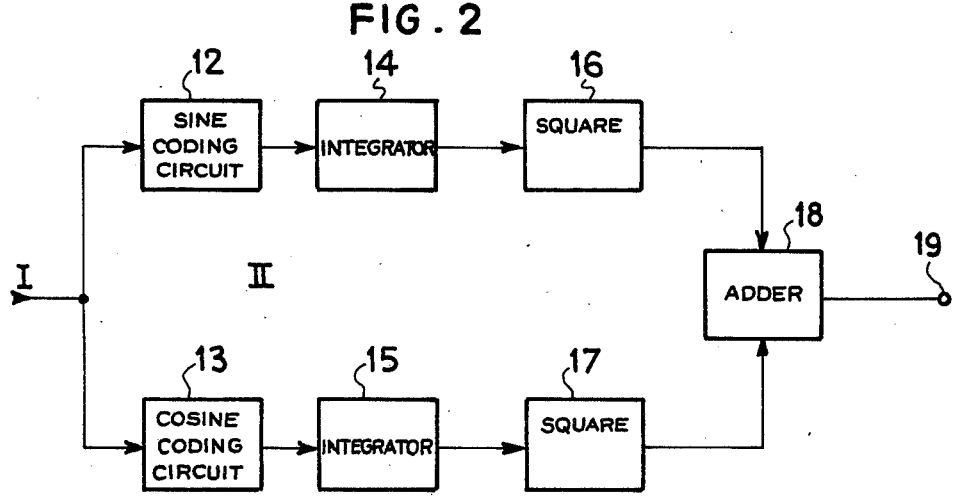
Figure 3:
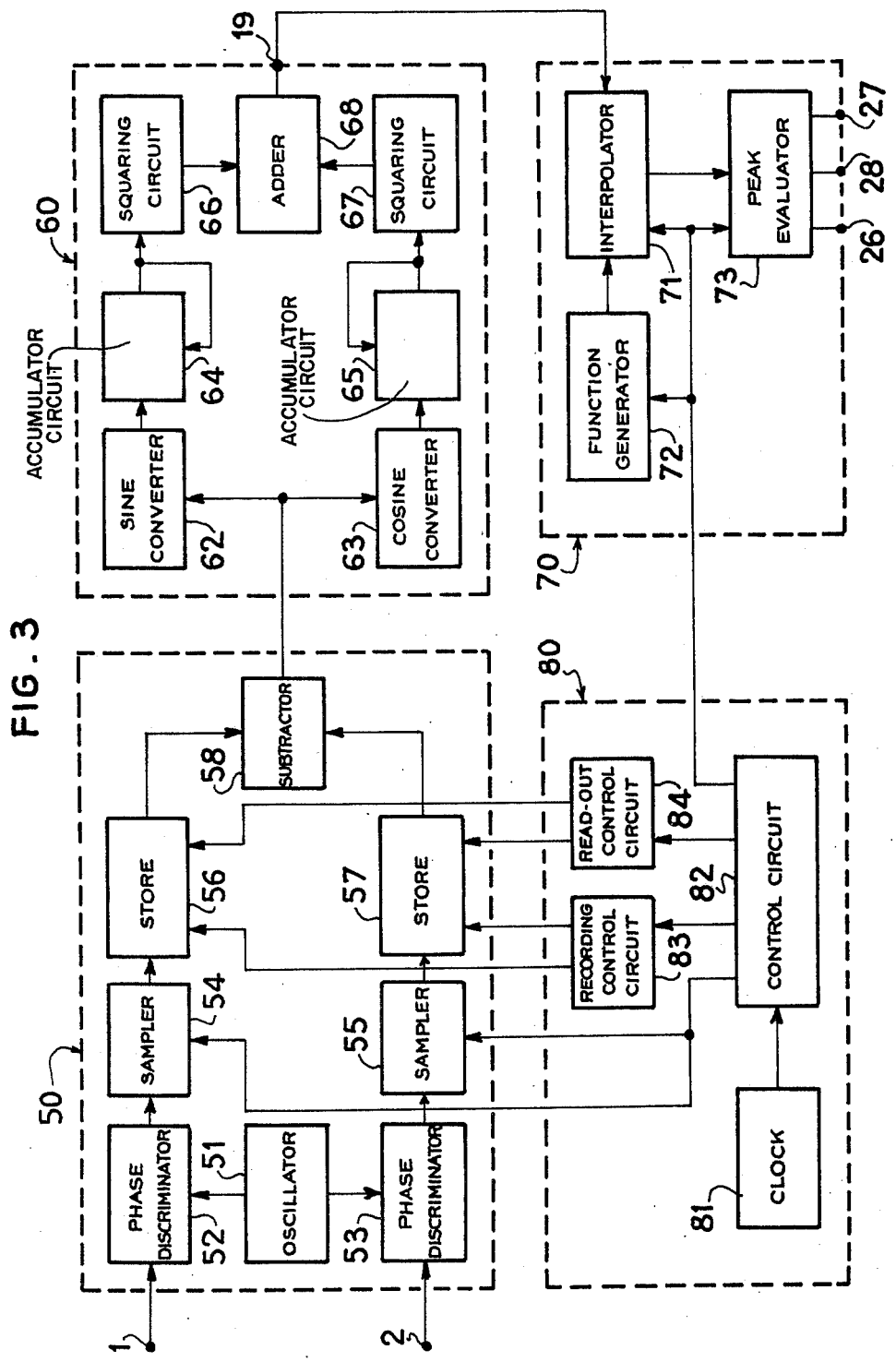
Figure 5:
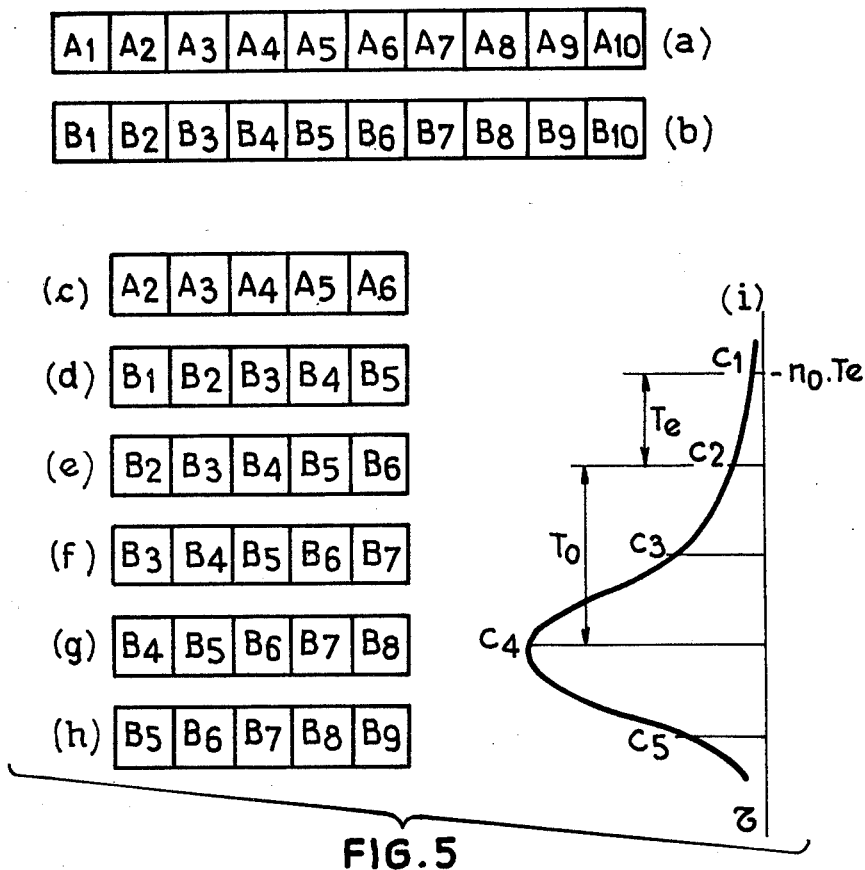
Figure 8:
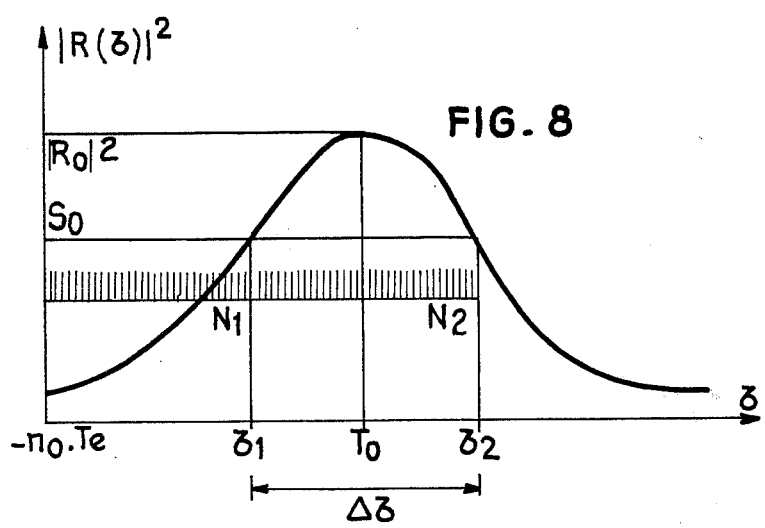
Figure 7:
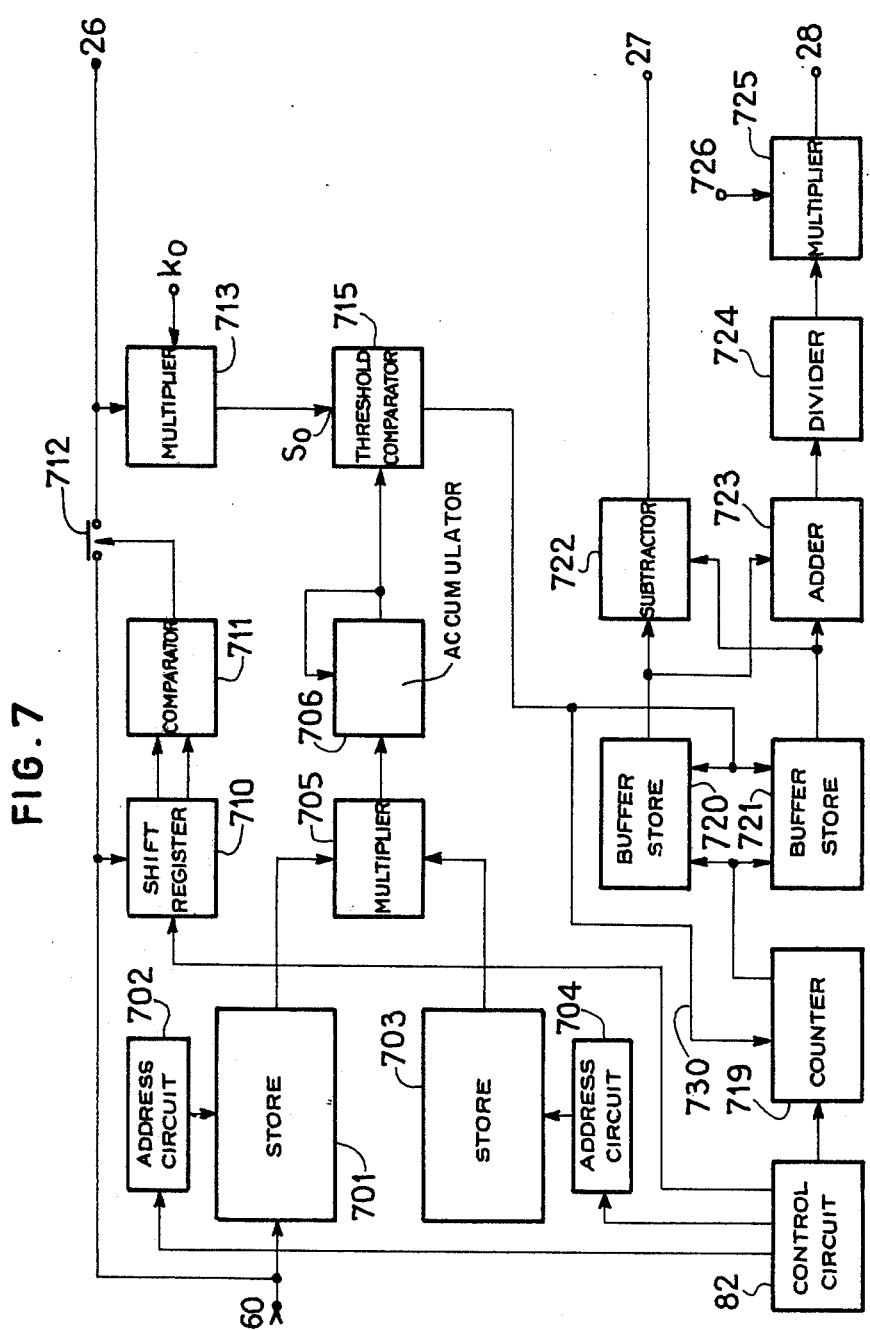

The invention will be better understood from a consideration of the ensuing description illustrated by the accompanying figures in which:

FIGS. 1 and 2 are block diagrams of the invention;
FIG. 3 is an example of the invention;
FIGS. 4, 6 and 7 illustrate details of the device shown in FIG. 3; and
FIGS. 5 and 8 are explanatory diagrams.

FIGS. 1 and 2 illustrate block diagrams of the invention.

The device illustrated is designed to determine the correlation function of two signals applied to two terminals 1 and 2. We are concerned here with signals exhibiting frequency or phase modulation. These signals may for example stem from frequency modulated, phase modulated or single side-band emissions. One of the signals is delayed in relation to the other, and the device in accordance with the invention is designed to determine this delay. The signals applied to terminals 1 and 2 are assumed to have previously been converted to a given frequency fo. They are first of all applied to band-pass filters 3 and 4 centred on the frequency fo, and then to limiters 5 and 6 and, finally, to phase detectors 7 and 8 respectively. The phase detectors are supplied with a reference wave produced by an oscillator 9. The frequency of the oscillator 9 is approximately equal to the frequency fo of the signals. The detectors 7 and 8 therefore furnish signals which represent the instantaneous phases $\phi 1$ and $\phi 2$ of the modulation of the inputs signals, this with the exception of the frequency difference between the reference and fo. One of these signals experiences a variable delay in a delay circuit 10. The two values $\phi 1$ and $\phi 2$ are then applied to a subtractor circuit 11. This part of the device, responsible for covering the phase detection of the signals, the delay and the subtracting of the phases, in marked in FIG. 1 by the general reference I. The succeeding circuits carry the reference II and have been shown in FIG. 2.

FIG. 2 represents a version of these circuits. The phase difference $\phi 1 - \phi 2$ is converted to its sine form in a coding circuit 12 and into its cosine form in a coding circuit 13. The coders 12 and 13 are respectively followed by integrators 14 and 15 and by square-law detectors 16 and 17 which produce the squares of the integrated signals; the sum of these squares is then formed in an adder 18 which furnishes at a terminal 19, a point on the plot of the square of the modulus of the correlation function, which will be designated in the ensuing description, in order to simplify matters, as a point on the correlation function.

For each delay value $\tau$ produced in one of the signals in the delay circuit 10, the device therefore computes the value of the correlation function by forming the sum of unitary vectors whose argument is the difference $\phi 1 - \phi 2$, over given time intervals. The correlation function is obtained by varying the delay $\tau$. When the output signal at the terminal 19 peaks, then the peak of the correlation function has been reached. The delay value $\tau$ corresponding to this is then equal to the delay To which separates two input signals.

Let $S_A(t)$ and $S_B(t)$ be the signals applied to the inputs 1 and 2 of the device in accordance with the invention. These can be expressed in the form:

$$S_A(t) = a \cos [2\pi fo(t) + \phi(t)]$$
$$S_B(t) = b \cos [2\pi fo(t - To) + \phi(t - To)]$$

where $a$ and $b$ are gain coefficients;

$fo$ is the frequency of the signals at the input of the devices;

$\phi(t)$ is the phase modulation of the signals; and $To$ is the delay of the signal $S_B(t)$ in relation to that $S_A(t)$.

The correlation function computed in the known devices is:

$$R(\tau) = \int_O^T S_A(t - \tau) \cdot S_B(t) dt$$

where $\tau$ is the variable delay and $T$ is a given, finite interval of time, very much longer than the reciprocal of the pass-band of the input signals.

One of the original features of the present invention is that the correlation function is computed from the phase measurement of the signals. The received signals are therefore limited in amplitude and this is the same as saying $a = b = 1$.

After limiting, the analysed signals are applied to phase detectors 7 and 8 which compare the received signals with that of a local oscillator 9 whose frequency is approximately equal to $fo$. If the frequency of the local oscillator 9 is not exactly equal to this value, the resultant modulations appearing at the output of the detectors, these depending, other than on the frequency difference, only on the variable delay $\tau$, compensate one another in the computing of the squared modulus of the correlation function so that at the output 19 the result is the same as if the frequency of the oscillator 9 had been exactly equal to $fo$.

The following equations assume that the frequency of the local oscillator 9 is equal to $fo$.

The output signals from the detectors can be represented by vectors of modulus unity, taking the form:

$$A(t) = e^{i 2\pi fo\, t + \varphi(t)} \cdot e^{-i 2\pi fo\, t} = e^{i\varphi(t)}$$
$$B(t) = e^{i 2\pi fo(t-To) + \varphi(t-To)} \cdot e^{-i 2\pi fo\, t} = e^{i\varphi(t-To) - 2\pi fo\, To}$$

and a point on the correlation function is obtained by carrying out the integration, over a given time T of the product of the vector of $A(t)$ shifted by $\tau$, and the conjugate vector of $B(t)$, namely:

$$R(\tau) = \int_O^T e^{i\phi(t - \tau)} \cdot e^{-i\phi(t - To) - 2\pi fo\, To} $$

In accordance with the example of FIG. 2, this operation is performed by computing the difference between the phases of the vectors $A(t - \tau)$ and $B(t)$ and then by separately computing the two components of $R(\tau)$:

$$X(\tau) = \int_O^T \cos [\phi(t - \tau) - \phi(t - To) + 2\pi fo\, To]$$

$$Y(\tau) = \int_O^T \sin [\phi(t - \tau) - \phi(t - To) + 2\pi fo\, To]$$

from which the squared modulus of the point on the correlation function is extracted, namely $$Z(\tau)^2 = X(\tau)^2 + Y(\tau)^2$$

When $\tau = To$, all the vectors of the product $A(t - To)$, have the same phase, equal to $2\pi fo\, To$, and the correlation function passes through a maximum or correlation peak. As indicated hereinbefore, if the frequency of the ocal oscillator which has made is possible to extract the phase of the signals furnished by the receivers, is shifted in relation to the value $fo$ of their carrier frequency, the phase differences between the vectors of $A(t - \tau)$ and $B(t)$ will incorporate an additional term, independent of $t$, which plays no part in the computing of the modulus of the square of the points on the correlation function.

The technical design of the devices shown in FIGS. 1 and 2 depends in particular upon the characteristics of the signals applied to the correlator. Two cases have to be distinguished: The first case is that in which the received signals are stationary with respect to time, that is to say that computing operations performed upon these signals can be reproduced at any instant and still yield the same results. It would therefore be possible to compute a first point on the correlation function, using signal samples of duration T, and subsequently each other point on the function using fresh samples taken in time-serial fashion. The second case is that in which the signals are not stationary except during the time T. This is the case with short signals.

In the first case, in which the signals to be processed are stationary whatever the time, the technology of the devices can be of analogue or digital kind. The delay circuit 10 can be arranged up-circuit or down-circuit of the phase detector. The delay circuit is designed, for example, in the form of electroacoustic delay lines if it is arranged up-circuit of the detector, or in the form of conventional video circuits if it is arranged down-circuit of the detector (as shown in FIG. 1). The correlation function calculator point-by-point is sampled in the rythm of incremental change in delay. Computing of the function can be performed using different samples of the input signals, for each point.

In the second case, where the signals are short, it is necessary to store samples of the signals for a time T and then to compute all the points of the correlation function on the basis of these same samples. The delay 10 is produced in the form of a shift between the times of read-out of the samples of a signal, in relation to one another. The technology may be analogue or digital, analogue storage for example being effected in shift-registers of the up-to-date kind known as charge coupler devices (CCD). The limiting delay which it is possible to introduce is equal to fraction of the time T unless a prior delay is introduced in one of the signals in relation to the other, prior, that is, to sampling and storage of the samples.

In all cases, the correlation function is obtained in point-by-point fashion; it may or not be quantized, depending upon whether digital or analogue, or again hybrid, technologies are used. Moreover, it is advantageous to interpolate the sampled function in order to improve the reconstitution of the correlation function and the related measurement of the delay.

FIG. 3 illustrates an example of a correlating device in accordance with the invention, of digital design, designed to operate on short signals. It has recourse to sampling and storage of the signal samples. All the points on the correlation function are then computed on the basis of a single series of samples. The input signals $S_A(t)$ and $S_B(t)$ are applied to the input terminals 1 and 2.

The correlator device can be split into four separate blocks: the block 50 is responsible for sampling the received signals during a time T, for their phase detection, for their storage, for read-out and for the subtracting of the samples.

The block 60 is responsible for integration at the complex level, of the phase differences, and supplies each point of the correlation function.

The block 70 effects interpolation of the correlation function between the points furnished by the blocks 60, and evaluates the delay, the amplitude and the width of the correlation peak. Finally, the block 80 incorporates circuits for the control and synchronising of the overall device.

To simplify the figure, the block 50 omits filtering and limiting circuits which have been shown in FIG. 1.

It will be assumed that the signal $S_B(t)$ is delayed by to in relation to the signal $S_A(t)$. These signals are applied to phase discriminator circuits 52 and 53 respectively, which receive a continuous signal of frequency substantially equal to fo, furnished by a fixed-frequency oscillator 51. The outputs of the discriminators are connected to the sampling circuits 54 and 55 which are controlled by the general control circuit 82. The samples are recorded in the stores 56 and 57 by means of a recording control circuit 83.

Once storage has been completed at the end of the time T, of sampling of the signal, the stored samples are read-out at relative intervals determined by means of a read-out control circuit 84 with the help of a clock 81 and a logic control circuit 82 in the block 80.

With each cycle of read-out of the samples, there corresponds a shift between the times of reading out of the stores 56 and 57, which effectively corresponds with the delay in one of the signals in relation to the other.

A subtractor 58 receives a sample from the stores and furnishes a signal representing the phase difference:

$$[\phi(t - \tau) - \phi(t - T_0) + 2\pi f_0 T_0]$$

In the block 60, this signal is converted into its sine in the circuit 62, and into its cosine in the circuit 63. The circuits 62 and 63 are similar as circuits 12 and 13 of FIG. 2. The accumulator 64 and 65 respectively furnish the sum of the sines and the sum of the cosines. Then the values obtained are squared in the circuits 66 and 67 and added together in the adder 68 in order to produce the square of the modulus of the corresponding point on the correlation function of the two signals.

With each read-out cycle there thus corresponds a different shift between the samples read-out from the stores, and a new point on the correlation function. The correlation function thus sampled is then supplied to the block 70. An interpolating device 71 coupled to a function generator 72, restores a sampled function in which the intervals are shorter. The centre of the correlation peak is evaluated in a circuit 73 using a threshold. The start and end of transit of this threshold, are marked. Their mean makes it possible to measure the delay To between the signals $S_A(t)$ and $S_B(t)$, supplied at the terminal 28. The circuit 73 then furnishes the value of the amplitude of the peak at the terminal 26 and the width of the peak, between the two terminal parts of the threshold transit, at the terminal 27. These latter two pieces of information are a posteriori pieces of information on the quality of measurement of the delay To.

Synchronising of the operations of read-out of the samples, of interpolation of the points on the correlation function and of evaluation of the values being sought, is performed by the logic control circuit 82 under the control of the clock 81.

A more detailed description of the block of circuits for phase coding and storage 50, integration 60, interpolation and evaluation 70 and control 80, is given in the following.

FIG. 4 illustrates an example of the block 50 in the correlation device in accordance with the invention. In this part of the device, the phase of the received signals is extracted by means of a single phase detector 503 associated with a local oscillator 504. The various signals received are applied to the inputs 30 and 40 of limiters 501 and 502 and then alternately to the phase detector 503 by means of switches 510 and 511 controlled by the logic control circuit 82 and the clock 81. The limiters 501 and 502 render the response of the phase detector linear. An example of the detector is described in U.S. Pat. No. 3,548,321. To recapitulate briefly, its operation is as follows: the squared bi-polar signal furnished by a limiter is mixed with two components, also limited and out of phase by 90°, from the local reference oscillator 504. After filtering, the signals obtained are two functions which vary linearly with the detected phase. The coder 505 makes it possible, from these two functions, to extract the quantised value, with p binary elements, of the phase.

Each received signal, sampled with a periodicity Te by the devices 510 and 511 and then detected and encoded, is subsequently stored. A switch device 512 synchronised with the switch device 510, transmits the phase information pertaining to the first channel, to the store 520. Similarly, a switch device 513 synchronized with the switch device 511, transmits the corresponding information of the second channel to the store 521. These stores have a capacity of N words made up of p binary elements each. They can be built using shift-registers or random access memories. In the latter case, each store is associated with an address circuit. In FIG. 4, random access memories have been shown. The address circuits 522 and 523 associated with the stores 520 and 521 respectively, are constituted by simple counters and a logic control arrangement for the recording or read-out of the stores. Recording control is common to the two stores and performed via the connection 526. Read-out control is effected via the connection 528. With each position on the part of a counter there corresponds a storage position in the corresponding store.

During a recording cycle, the successive samples are stored in the storage positions of different stores by means of pulses applied to the counters of the address circuits through the connections 524 and 525.

Each store can record only N samples of the received signal. This operation is performed therefore during the time NTe, where Te is the sampling periodicity of the signals. This sampling periodicity is the same for the two channels but the samples in one channel are time-staggered by half a period in relation to those in the other channel due to the alternating transit of the signals through the single phase detector 503.

During a read-out cycle, the samples stored in the stores are reconstituted. The content of a storage position corresponding to the position of the counter in the associated address circuit, is transmitted to the subtractor 58. Self-evidently, read-out is non-destructive. The information can only be destroyed by the production of the new recording command. Pulses applied to the address circuits therefore make it possible to reconstitute the recorded samples in the order in which they are addressed in the stores.

The counters of the address circuits can be placed in a predetermined position. If they are reset to zero, the samples are read-out commencing from the first element. If they are pre-set to the value $n$, the samples are read-out commencing from the $n^{th}$ element. Pre-setting can be different in each of the two address circuits. The delay variation increment can thus be effected with a pitch or interval equal to Te or to a multiple of Te, working from a given position and in the positive or negative time sense in relation to the origin of recording.

Read-out of the stored samples is very fast. It is performed simultaneously in the two stores, the two signals read-out being transmitted to the subtractor 58. The read-out speed is determined solely by the speed of the succeeding computing circuits. The read-out of the N samples makes it possible to compute a point on the correlation function. If, for example, $n$ successive points are required to plot the effective part of the correlation function, then $n$ read-out operations must be performed on the stores, each time with a different shift between the samples, equivalent to a sampling period.

In order to determine the value of $n$, that is to say in order to be able to find out how many read-out operations are required, it is necessary to know a maximum value Tomax of the delay To, it is required to measure. For this delay, the correlation peak will be achieved when the sample shift number is equal to Tomax/Te. In order to find out the width of the peak, it is necessary at either side thereof to compute a number no of points on the correlation function. If the sign of the Tomax delay is not known, then it is necessary to compute a maximum number of points on the correlation function, which may be equal to or greater than 2 [no + Tomax/Te].

If, of the two signals for correlation, one always leads the other, then only no shifts in the direction of negative delays, will be performed in order to take account of the half-width of the peak, in the case of a zero delay, and at the most no + Tomax/Te shifts in the direction of positive delays, in the case of a delay equal to Tomax.

It will be assumed in the following that one of the signals is always in a leading position relatively to the other (the lead may be zero). Because of the shift between the samples taken from one store and those taken from the other, certain samples from one store (the first in the case of one store or the last in the case of the other) are not associated with any significant sample from the other store. To avoid the occurrence of non-significant computing of the correlation, one of the address circuits is given an initial pre-setting corresponding to a shift of no samples in the associated store, and during each computing of points only the N-no first pieces of information following the pre-setting, are taken into account.

FIG. 5 schematically summarizes the operations which are performed during the course of a read-out cycle. To simplify matters, it will be assumed that ten samples have been stored in the two stores A and B. These samples are marked A1 to A10($a$) in the case of the store A and B1 to B10 ($b$) in the case of the store B. It will be assumed that the maximum number of points to be computed is 5 and that the width of the correlation peak is less than 2Te.

The counter of the address circuit associated with the store A is initially pre-set to begin with sample A2 ($c$). For the computing of the first point on the correlation function ($i$), the stores A and B furnish the pairs of samples A2-B1, A3-B2, A4-B3, A5-B4 and A6-B5 (($c$) and ($d$) in FIG. 5). The correlator then determines the point C1 on the correlation function ($i$). At the end of the first computing operation, a shift is effected in the samples held in the store B in order to increase the delay variable $\tau$ by the value of Te. The point C2 is then computed from the pairs of samples A2-B2, A3-B3, A4-B4, A5-B5, A6-B6 ($c$) and ($e$). With each ensuing computing operation, a fresh shift is effected in the samples held in the store B. The points C3, C4 and C5 are obtained from the pairs of samples ($c$) and ($f$), ($c$) and ($g$), ($c$) and ($h$) respectively. The graph ($i$) shows that the correlation peak is achieved when the samples from A have been associated with those from B which have been shifted by two orders. The delay To thus quantised as a multiple of the period Te, is therefore equal to twice the period Te.

Since the example described is a very much simplified one, it is highly unlikely in reality that the correlation peak would coincide exactly with a point on the correlation function; it is therefore advantageous to reconstitute the latter with the help of an interpolating circuit. The means used to compute the parameters of the function will therefore be described in the following.

Instead of random-access memories, the stores 520 and 521 of FIG. 4 could be built using looped shift-registers. In this case, the shift pulses can be applied directly to the register. It is merely necessary to provide circuits making it possible to record samples during a first phase and to effect non-destructive read-out of the samples during the next phase.

FIG. 6 illustrates an example of the phase-measurement and record/read-out circuits of a double correlator which makes it possible, by differential measurements of the arrival time, to determine the position of an electromagnetic source whose signals are picked up by three antennas. To this end, a limiter 500 is added to the limiters 501 and 502 in order to be able to directly receive three incoming signals.

The phase detection and coding circuits 506 are common to the three channels. The pairs of samplers 514-515, 510-512 and 511-513 are operated sequentially in order to subdivide the time of operation of the detection and coding circuits. The coded signals are distributed between three groups of two stores corresponding to each channel. In each group, one of the stores is in the recording position whilst the other is in the read-out position. In the example shown in the Figure, the switches 551, 552, 553 direct the signals for recording towards the stores 531, 532, 533 respectively. At the same time, the signals read-out from the stores 541, 542, 543 are applied in pairs to the subtractor circuits 610 and 611 by the set of switches 561, 562 and 563. The subtractor units are then connected to blocks 60a and 60b respectively, identical to the block 60 shown in FIG. 3.

The computing of all the points on a correlation function whose effective duration is less than that of the recording of the samples of the signals, is thus performed during the recording of the samples intended for the next computing operation. At the end of a recording/read-out cycle, the switches 551, 552, 553, 561 and 563 change state in order to make it possible to compute the points on the function whose samples have been recorded during the preceding cycle, and in order to record the samples which, during the next cycle, will be used to compute the points on a fresh function.

Thus, the processing capacity of the correlator device has effectively been doubled.

Each point on the correlation function is determined in the block 60 shown in FIG. 3. The information stored in the stores up-circuit, and applied in information pairs to the subtractor 58, represent phase angles. By forming the sine and the cosine of the difference between said angles, one is on each occasion taking the vector of unit length whose co-ordinates in X and Y directions are equal to said sine and cosine. Th correlator then forms the vector sum of all the vectors, corresponding to the pairs of samples read-out from the stores. The adder circuit 68 then furnishes the square of the modulus of the resultant of this vector sum.

The sine converter 62 is supplied at its input with a digital signal representing an angle and furnishes at its output a digital signal representing the sine of said angle. It is constituted, for example, by a read-only-memory (RAM) containing a given number of sine values. The input signals are converted into address signals which control the read-out of the corresponding storage positions in the memory. The cosine converter 63 is identical from the physical point of view but the stored values are cosines values.

The accumulator 64 and 65 are conventional in design. They add to the preceding result, the new value extracted from the up-circuit decoder.

The squaring circuits 66 and 67 are for example constituted likewise by read-only memoires (RAM) containing a certain number of square values: the output result from the adder is used as an address signal in order to extract the square of the value from the corresponding RAM. The signals read-out from the two stores 66 and 67 are applied to the adder 68 which therefore furnishes the square of the modulus of the aforesaid resultant vector. This value represents a point on the correlation function.

FIG. 7 illustrates the block 70 of the circuits which perform the interpolation between points on the correlation function and evaluate the results, namely the value of the delay To and the amplitude and width of the correlation peak.

The correlation function points determined in the block 60 are stored in a store 701 which may be of random-access or sequential-access kind, associated with an address circuit 702 controlled by the general logic controlled circuit 82. The interval between function points thus stored is equal to the sampling period Te. This interval being too wide for the desired level of accuracy, it is necessary to interpolate the correlation function between the computed points. This interpolation process is performed by means of samples of a given weighting function previously recorded in a store 703 associated with its address circuit 704. The interval between the samples of the weighting function is much smaller (fifty times less for example), than that of the samples obtained from the correlation function. Interpolation is performed in a manner known per se by forming the sum of the products of a number $k$ of successive samples of the correlation function, and $k$ weighting functions which are identical but are off-set in relation to one another by the sampling time Te. In practice, it is possible to limit this operation for example to $k = 4$. The multiplying of the samples is performed by a multiplier 705 followed by accumulator 706.

The output of the cumul circuit 706 is connected to a threshold comparator 715 in order, through an appropriate logic system, to extract a measurement of the delay To separating the received signals.

FIG. 8 which illustrates the square of the modulus of the interpolated correlation function $|R(\tau)|^2$, shows the function peak, of amplitude $|Ro|^2$ obtained for a delay $\tau = To$. It is not a good idea to directly determine the abscissa point of the correlation peak, since this is more seriously affected by noise fluctuations in the neighbourhood of the point where the function slope is zero. The position of the peak is therefore determined by comparing the function with a threshold So lower than the amplitude of the peak; this threshold thus determines two points on the function in respect of which the delays are $\tau 1$ and $\tau 2$. The delay is then obtained by forming the arithmetic mean of the two values $\tau 1$ and $\tau 2$. These two values can be obtained with an accuracy the higher the greater the absolute value of the slope of the correlation function at their level. The pitch or interval of the weighting function used for the interpolation procedure, has an influence upon the accuracy of the delay measurement. This interval is chosen in accordance with the desired level of accuracy.

FIG. 7 illustrates by way of example how the delay To is determined. To do this, a counter 719 is advanced regularly by pulses emitted by the logic control circuit 82, at intervals corresponding to the weighting function interval, that is to say at a recurrence periodicity Tp, and in synchronism with the computing of each point on the interpolated correlation function. These pulses are emitted commencing from the instant $p = -noTe$, this being the origin of computing of the correlation function. As soon as the amplitude of the correlation function reaches the threshold So for the first time, the corresponding value reached by the counter 719 is stored in a buffer store 720 under the control of the comparator 715. The number of pulses totalled up to this point is N1. As soon as the amplitude of the correlation function drops to below the threshold So, the counter 719 stops, recording a number N2 which is stored in a buffer store 721.

The outputs of the stores 720 and 721 are connected to the inputs of a subtractor 722. The output of the subtractor supplies N2 − N1 which, as a multiple of Tp, represents the width of the correlation peak. This information is used to assess the quality of the measurement carried out.

The outputs of the stores 720 and 721 are also connected to an adder 723 followed by a divider 724 performing division by two, which furnishes N1 + N2/2. This result is applied to a multiplier circuit 725 whose other input 726 is supplied with the value Tp of the recurrence periodicity of the points on the interpolated correlation function. The output of the multiplier 725 therefore furnishes the desired delay To with a known shift of ± Te/2 which arises from the fact that sampling of the signals at the input of the correlator device is performed in an alternating manner.

The position of the threshold So of the comparator 715 can be pre-set, either once and for all or, in association with measurement of the value of the correlation peak $|Ro|^2$, in such a way as to optimise the measurement effected in the neighbourhood of the two points of maximum slope of the correlation function. Commencing from this value $|Ro|^2$, as indicated in FIG. 7, the product of $|Ro|^2$ and a constant coefficient ko which can also be optimised if the shape of the correlation function is known a priori, (ko = 0.6 for example, for a gaussian function), in a multiplier 713, furnishes a threshold So for each measurement. The accuracy of measurement of the delay To is thus optimum with each measurement.

This value $|Ro|^2$ of the peak is determined with the help of the function points computed in the block of circuits 60. These points are applied successively to a two-position shift-register 710. With the arrival of each point, a shift pulse is applied to the register by the control circuit 82. The register therefore contains in its storage positions, the value of a stored point and the value of the preceding point. One of these values is applied to a comparator 711 which first of all compares it with a minimum threshold equal to the detection threshold. If the amplitude of the correlation function exceeds this threshold (in the neighbourhood of the peak), the two consecutive values of the register 711 are compared with each other. The difference $|Ri+1|^2 - |Ri|^2$ is first of all positive. As soon as it becomes zero or negative, at the peak at the correlation function, the signal from the comparator 711 closes a contactbreaker 712 which transmits the value $|Ro|^2$ of the peak to the multiplier 713 and to the output terminal 26.

Self-evidently, the threshold So is in this case unknown until the instant at which the function passes through the peak. The counter 719 cannot furnish the value Ni on transit of the first intersection point. In order to find this value, several solutions are possible.

One consists for example, in receiving all the points on the correlation function up to Tomax, which are furnished by the block 60, in storing them in the store 701 and in simultaneously determining the value of the peak $|Ro|^2$ and that of the threshold So. This done, the control circuit 82 recovers each point on the correlation function successively working from the first, carries out interpolation and accurately determines the points of intersection with the threshold So. During this time, the counter 719 is regularly advanced and furnishes the values N1 and N2 to the buffer stores 720 and 721. Computing is halted as soon as the value N2 is known.

Another, faster solution consists in simultaneously determining $|Ro|^2$ and So, storing the samples of the correlation function, carrying out interpolation and advancing the counter 719. The latter halts as soon as the value N2 is reached. The computing of the points on the interpolated function is then carried out again in the reverse direction, with each point there corresponding a backward counting pulse applied to the counter 719. When the first threshold is reached and the value N1 is known, computing is halted. In FIG. 7, the connection 730 while links the output of the comparator 715 to the counter 719 makes it possible to convert the latter to a backward counter and thus to reverse the direction of computing of the point on the function as soon as the number N2 is known.

The circuit 82 is designed with the help of logic counting circuits in order to form the various trains of control pulses which are required to operate the circuits of the correlator device. This circuit can be easily designed by any person skilled in the art of digital techniques.

What is claimed is:

1. A correlator device for determining the correlation function of two phase-modulated signals having a given carrier frequency comprising, phase detecting means to which the said modulated signals are applied separately for delivering the phase difference $\phi 1$ and $\phi 2$ between said modulated signals and a reference signal, delay means for delaying one of the signals in relation to the other by a variable delay time, subtractor means for forming the difference $\phi 1 - \phi 2$, computing means for forming the sine and the cosine of the difference $\phi 1 - \phi 2$, for integrating separately said sine and cosine during a given period of time and, for delivering the sum of the square of the result of said integrations, and means for varying said variable delay time.

2. A correlator device for determining the correlation function of two phase-modulated signals having a given carrier frequency comprising, phase detecting means to which the said modulated signals are applied separately for delivering the phase differences $\phi 1$ and $\phi 2$ between said modulated signals and a reference signal, sampling and storing means for storing separately series of samples of said phase differences $\phi 1$ and $\phi 2$, read-out means for reading out the two series of stored samples in accordance with the chronological order of recording and with a variable shift between the samples of one series in relation to those of the other, subtractor means for forming the phase difference $\phi 1 - \phi 2$ of each pair of samples read-out, computing means for forming the sine and the cosine of said phase difference $\phi 1 - \phi 2$, for integrating separately said sine and cosine during the read out time of the samples and for delivering the sum of the square of the results of integrations, and means for varying said variable shift.

3. A correlator device as claimed in claim 2, further comprising interpolating means for computing the value of the correlation function between two successive values delivered by the computing means.

4. A correlator device as claimed in claim 3, further comprising means for evaluating the difference in time between the peak of the correlation function and a reference instant, said difference in time being equal to the delay time between the input signals.

5. A correlator device as claimed in claim 2, wherein said sampling and storing means comprises a store for storing each series of phase samples, an address circuit connected to said store for addressing each sample in a given part of said store, a pair of switching means for sampling each phase difference, arranged respectively up-circuit and down-circuit of said phase detecting means and control circuit means for controlling sequentially the pairs of switching means.

6. A correlator device as claimed in claim 5, wherein said phase detecting means comprises an oscillator for delivering a reference signal having a frequency substantially equal to the carrier frequency of the input signals, a phase detector for receiving sequentially said input signals and said reference signal and coding means connected to said detector for delivering the phase difference between said signals.

7. A correlator device as claimed in claim 5, wherein each store comprises at least two sub-stores and swtiching means arranged up-circuit and down-circuit thereof, so that one of the two substores operates in the recording mode whilst the other is performing read out, and vice-versa.

8. A correlator device as claimed in claim 3, wherein said interpolation means comprise a first store supplied with the successive output signals of the computing means, a second store containing samples of a predetermined weighting function, multiplying means for multiplying a given number of output signals stored in the first store by the same number of samples stored in the second store, and means for adding the successive results of said multiplying means.

9. A correlator device as claimed in claim 8, further comprising a threshold comparator for receiving the output signal of the adding means and a threshold signal, a counter circuit advanced in synchronism with the computation of each output signal of the adding means, a first buffer store connected to said counter and controlled by said threshold comparator for storing the value in the counter when the said output signal exceeds the threshold signal, a second buffer store connected to said counter and controlled by said threshold comparator for storing the value in the counter when the said output signal undershoots said threshold signal, arithmetic mean computing means connected to said buffer stores for computing the arithmetic mean of the contents of said stores and multiplying means for multiplying said arithmetic mean by a number which represents the recurrence period of the said output signals.

10. A correlator device as claimed in claim 9, further comprising a subtractor circuit connected to said buffer stores for delivering an indication of the width of the correlation peak.

11. A correlator device as claimed in claim 9, further comprising comparator means for comparing the values of two successive output signals of the computing means, and switching means connected between the output of said computing means and an output terminal for delivering the value of the correlation peak amplitude, said switching means being controlled by said comparator means in order to transmit the peak value to the output terminal when the compared values are equal.

12. A correlator device as claimed in claim 11, further comprising a multiplying circuit connected to said output terminal, for furnishing to the threshold comparator a threshold signal which is proportional to the peak amplitude.

* * * * *